(12) United States Patent
Reeves et al.

(10) Patent No.: US 7,829,139 B2
(45) Date of Patent: Nov. 9, 2010

(54) METHOD OF MAKING NANOPARTICLE WIRES

(75) Inventors: Mark Reeves, Arlington, VA (US); Jiajie Diao, Springfield, VA (US)

(73) Assignee: The George Washington University, Washington, DC (US)

( * ) Notice: Subject to any disclaimer, the term of this patent is extended or adjusted under 35 U.S.C. 154(b) by 552 days.

(21) Appl. No.: 11/886,464

(22) PCT Filed: Feb. 24, 2006

(86) PCT No.: PCT/US2006/006379

§ 371 (c)(1),
(2), (4) Date: Sep. 17, 2007

(87) PCT Pub. No.: WO2006/101659

PCT Pub. Date: Sep. 28, 2006

(65) Prior Publication Data

US 2008/0182013 A1    Jul. 31, 2008

(51) Int. Cl.
*B05D 1/24* (2006.01)
*B05D 5/00* (2006.01)
*B05D 1/18* (2006.01)

(52) U.S. Cl. .................. 427/197; 427/430.1; 427/180; 427/201; 427/256

(58) Field of Classification Search ............... 427/430.1
See application file for complete search history.

(56) References Cited

U.S. PATENT DOCUMENTS

| | | |
|---|---|---|
| 6,333,200 B1 | 12/2001 | Kaler et al. |
| 6,781,166 B2 | 8/2004 | Lieber et al. |
| 6,861,221 B2 | 3/2005 | Mirkin et al. |
| 2003/0180472 A1* | 9/2003 | Zhou et al. ............... 427/430.1 |
| 2003/0200521 A1 | 10/2003 | DeHon et al. |

OTHER PUBLICATIONS

Ten et al. Growth imperfections in three-dimensional colloidal self-assembly, Appl. Phys. A 81, 1399-1404.*

(Continued)

*Primary Examiner*—David Turocy
(74) *Attorney, Agent, or Firm*—Panitch Schwarze Belisario & Nadel LLP

(57) ABSTRACT

A new method of making self-assembled nanoparticle wires involves:
(1) at about ambient temperature and at or near atmospheric pressure, immersing a hydrophilic solid substrate at a non-horizontal angle (e.g., vertically) into a suspension of nanoparticles in a solvent, the suspension having a negative meniscus, the immersion forming a solid-liquid-air interface at the meniscus of the suspension;
(2) gradually exposing the immersed substrate to air by gradually removing (preferably evaporating) the suspension, thereby causing deposition of the nanoparticles at a first location on the substrate at the meniscus, thereby forming a first nanoparticle wire on the substrate;
(3) after a first deposition time period, rapidly removing a portion of the suspension, thereby causing deposition to stop and then re-start at a second location on the substrate at the meniscus;
(4) continuing to gradually expose the immersed substrate to air by gradually removing the suspension for a second deposition period, thereby forming a second nanoparticle wire on the substrate; and optionally
(5) repeating steps (3) and (4) one or more times to form one or more successive nanoparticle wires on the substrate.

The above method can also be used to form integrated nanoparticle wire arrays.

23 Claims, 4 Drawing Sheets

OTHER PUBLICATIONS

Diao et al. Surface vertical deposition for gold nanoparticle film. J. Phys. D: Appl. Phys. 36 (2003) L25-L27.*

Dimitrov et al. Continuous Convective Assembling of Fine Particles into Two-Dimensional Arrays on Solid Surfaces. Langmuir 1996, 12, 1303-1311.*

Diao et al. Self Assembled nanoparticle wires by discontinuous vertical colloidal deposition. App. Phys. Let. 87, 103113 (2005).*

Colvin et al., "Light-emitting diodes made from cadmium selenide nanocrystals and a semiconducting polymer," Nature, vol. 370, Aug. 1994.

Collier et al., "Reversible Tuning of Silver Quantum Dot Monolayers Through the Metal-Insulator Transition," Science, vol. 277, Sep. 1997.

Mirkin et al., "A DNA-based method for rationally assembling nanoparticles into macroscopic materials," Nature, vol. 382, Aug. 1996.

Shenton et al., "Directed Self-Assembly of Nanoparticles into Macroscopic Materials Using Antibidy-Antigen Recognition," Advance Materials, 1999.

Hermanson et al., "Dielectrophoretic Assembly of Electrically Functional Microwires from Nanoparticle Suspensions," Science, vol. 294, Nov. 2001.

Bhatt et al., "Control and Modeling of the Dielectrophoretic Assembly of On-Chip Nanoparticle Wires," Langmuir, vol. 20, No. 2, 2004.

Norris et al., "Chemical Approaches to Three-Dimensional Semiconductor Photonic Crystals," Advanced Materials, 13, 2001.

S.H. Im, et al., "Three-Dimensional Self-Assembly of Colloids at a Water-Air Interface: A Novel Technicque for the Fabrication of Photonic Bandgap Crystals," Advanced Materials, 14, No. 19, Oct. 2002.

Iskandar et al., "Optical band gap and ultralow dielectric constant materials prepared by a simple dip coating process," Journal of Applied Physics, vol. 93, No. 11, Jun. 2003.

Diao et al., "Surface vertical deposition for gold nanparticle film,' Journal of Physics D: Applied Physics," 36, 2003.

S.J. Park, et al., "Array-Based Electrical Detection of DNA with Nanoparticle Probes," Science, vol. 295, Feb. 2002.

Diao et al., "Theoretical analysis of vertical colloidal deposition," The Journal of Chemical Physics, 122, 2005.

X. Duan et la., "Indium phosphide nanowires as building blocks for nanoscale electronic and optoelectronic devices," Letters to Nature, vol. 409, Jan. 2001.

Patolsky, et al., "Electrical detection of single viruses," Proc. Natl. Acad. Sci., U.S.A., vol. 101, No. 39, Sep. 2004.

Cui et al., "Functional Nanoscale Electronic Devices Assembled Using Silicon Nanowire Building Blocks," Science, vol. 291, Feb. 2001.

Huang et al., "Directed Assembly of One-Dimensional Nanostructures into Functional Networks," Science, vol. 291, Jan. 2001.

Diao, et al., "Self assembled nanoparticle wires by discontinous vertical colloidal deposition," Applied Physics Letters, 87, 2005.

L.K. The, et al., "Growth imperfections in three-dimensional colloidal self-assembly," App. Phys. A, 81, 2005.

Liddle et al., "Lithographically directed self-assembly of nanostructures," J. Vac. Sci. Technol. B, 22(6), 2004.

Dimitrov et al., "Continuous Convective Assembling of Fine Particles into Two-Dimensional Arrays on Solid Surfaces," Langmuir, vol. 12, No. 5, 1996.

* cited by examiner

METHOD OF MAKING NANOPARTICLE WIRES

STATEMENT REGARDING FEDERALLY SPONSORED RESEARCH OR DEVELOPMENT

This invention was made with Government support under Contract Number N00173-04-2-C004, awarded by The Naval Research Laboratory and by the tems of Grant Number DAAD 19-01-1-0508 awarded by The Army Research Office. The Government may have certain rights in this application.

BACKGROUND OF THE INVENTION

This invention relates to methods of making nanoparticle wires. More particularly, this invention relates to a method of making self-assembled nanoparticle wires by a discontinuous evaporation-driven colloidal deposition method.

Nanostructured materials have received substantial attention recently due to their immense potential in technological applications. Important advances regarding the fundamental properties of nanoparticles have been reported. Reference is made, e.g., to Colvin, V. L.; Schlamp, M. C.; Alivisatos, A. P., *Nature* 1994, 370, 354; and Collier, C. P.; Saykally, R. J.; Shiang, J. J.; Henrichs, S. E.; Heath, J. R., *Science* 1997, 277, 1978. While important advances regarding the fundamental properties of nanoparticles have been made, research is being conducted to provide advanced nanoassemblies that may bring a wide range of innovation in optical and electronic devices. See, e.g., Mirkin, C. A.; Letsinger, R. L.; Mucic, R. C., Storhoff, J. J., *Nature* 1996, 382, 607; Shenton, W.; Davis, S. A.; Mann, S., Adv. Mater. 1999, 11, 449; and Hermanson, K. D.; Lumsdon, S. O.; Willimas, J. P.; Kaler, E. W.; Velev, O. D., *Science* 2001, 294, 1082. A common and simple technique to assemble nano-particles into functional structures is dip coating. This technique is disclosed, e.g., in Bhatt, K. H.; Velev O. D. *Langinuir* 2004, 20, 467; and Norris, D. J.; Vlasov, Y. A., *Adv. Mater.* 2001, 13, 371. Sol-gel dip coating has been recently developed as a depositional method at air-water-substrate interfaces for preparing nanoparticle thin films. Reference is made, for example, to S. H. Im, Y. T. Lim, D. J. Suh and O. O. Park, *Adv. Mater.* 14, 1367 (2002); and Iskandar, F.; Abdullah, M.; Yoden, H.; Okuyama, K., *J. Appl. Phys.* 2003, 93, 9237. Preparation of nanoparticle thin films using a deposition method referred to as "Evaporation-Driven Colloidal Deposition" is disclosed in J. J. Diao; F. S. Qiu; G. D. Chen and M. E. Reeves (2003) *J. Phys. D Appl. Phys.* 36, L25.

The formation of microwires from nanoparticle suspensions is described in Hermanson, K. D.; Lumsdon, S. O.; Williams, J. P.; Kaler, E. W.; Velev, O. D., Science 294, 1082-1086 (2001). The article describes the assembly of microwires by dielectrophoresis from aqueous suspensions of metallic nanoparticles, wherein the wires are formed in gaps between planar electrodes disposed on a substrate.

U.S. Pat. No. 6,333,200 to Kaler and Velev discloses a miniaturized immunosensor composed of a substrate having fabricated patterns forming microelectrodes with microscopic gaps between the electrodes, and colloidal latex particles dielectrophoretically deposited in the microscopic gaps. The particles have thereon biospecific molecules that specifically bind and collect target molecules.

In Park, S.; Taton, T. A.; Mirkin, C. A., *Science* 295, 1503-1506 (2002), a DNA array detection method is reported wherein the binding of oligonucleotides functionalized with gold nanoparticles is said to lead to conductivity changes associated with target-probe binding events. The article teaches that selective binding occurs between a shorter "capture" oligonucleotide strand located in the gap between two fixed microelectrodes and longer "target" oligonucleotide in solution. The target oligonucleotide has contiguous recognition elements that are complementary to the capture strand on one end and on the other to oligonucleotides attached to Au nanoparticles. Therefore, when the device with the pair of electrodes is immersed in a solution containing the appropriate probe and target, Au nanoparticle probes fill the gap.

U.S. Pat. No. 6,861,221 to Mirkin et al. discloses methods of detecting a nucleic acid involving contacting the nucleic acid with one or more types of particles having oligonucleotides attached thereto. The oligonucleotides may be bound to the particles through a sulfur linkage.

U.S. Pat. No. 6,781,166 to Lieber, et al. and U.S. Published Application No. 20030200521 to DeHon et al. describe the use of nanowires made out of rod-shaped nanoparticles. The Lieber et al. patent discloses that the nanowires can be arranged in crossbar arrays using chemically patterned surfaces for direction, via chemical vapor deposition. The patent further teaches that chemical vapor deposition also can be used to form nanotubes in arrays in the presence of directing electric fields, optionally in combination with self-assembled monolayer patterns.

All of the publications and patents cited above are hereby incorporated by reference herein.

SUMMARY OF THE INVENTION

In a first aspect thereof, the present invention provides a new method of making self-assembled nanoparticle wires. This method, referred to herein as "discontinuous evaporation-driven colloidal deposition" ("discontinuous EDCD"), involves the following:

(1) at about ambient temperature (e.g., about 25° C. to about 30° C.) and at or near atmospheric pressure, immersing a hydrophilic solid substrate at a non-horizontal angle into a suspension of nanoparticles in a solvent, the suspension having a negative meniscus, the immersion of the substrate forming a solid-liquid-air interface at the meniscus;

(2) gradually exposing the immersed substrate to air by gradually removing the suspension, thereby causing deposition of the nanoparticles at a first location on the substrate at the meniscus, forming a first nanoparticle wire on the substrate;

(3) after a first deposition time period, rapidly removing a portion of the suspension, thereby causing deposition to stop and then re-start at a second location on the substrate at the meniscus;

(4) continuing to gradually expose the immersed substrate to air by gradually removing the suspension for a second deposition period, thereby forming a second nanoparticle wire on the substrate; and optionally (5) repeating steps (3) and (4) one or more times to form one or more successive nanoparticle wires on the substrate.

The width of the nanoparticle wires is controlled by the deposition time and evaporation rate, and the distance between two adjacent nanoparticle wires is dictated by the volume of the suspension removed.

The method of this invention is simple, fast and easily controlled.

Unlike the methods taught in Hermanson, K. D.; Lumsdon, S. O.; Williams, J. P.; Kaler, E. W.; Velev, O. D., Science 294, 1082-1086 (2001) ("the Velev article") and in U.S. Pat. No. 6,333,200 to Kaler and Velev ("the '200 patent"), the method of the present invention permits control of the position of the nanoparticle assemblies by placing the meniscus at the place on the substrate where a wire is desired to be deposited. The methods disclosed in the Velev article and the '200 patent do not permit such control. Furthermore, the nanoparticle wires formed by the method of the present invention have a straight geometry, in contrast to the wires formed by the methods disclosed in the Velev article and the '200 patent, where the formed wires have a fractal geometry with many branches and bends along their paths. Furthermore, the methods taught in the Velev article and the '200 patent are limited to using metallic nanoparticles, whereas the method of this invention can use any type of nanoparticle.

Unlike the nanoparticle wires formed in U.S. Pat. No. 6,781,166 to Lieber, et al. ("the Lieber patent") and U.S. Published Application No. 20030200521 to DeHon et al. ("the DeHon application"), the nanoparticle wires formed by the method of the present invention are assemblies of nanoparticles of any type, e.g., metal, semiconductor, insulator, etc. and can be quite long, e.g., longer than 1 cm. On the other hand, the nanoparticles formed by the methods disclosed in the Lieber patent and the DeHon application are all single crystal, semiconductors having a relatively short length, e.g., a few microns.

The method of the present invention also differs from the methods taught in Mirkin, C. A.; Letsinger, R. L.; Mucic, R. C., Storhoff, J. J., *Nature* 1996, 382, 607; Park, S.; Taton, T. A.; Mirkin, C. A., *Science* 295, 1503-1506 (2002) and U.S. Pat. No. 6,861,221 to Mirkin et al., (the methods disclosed in the foregoing references being collectively referred to as "the Mirkin methods"). The Mirkin methods rely on the use of chemical linkers to attach nanoparticles to a substrate. The method of the present invention does not require any attachment material to attach the nanoparticles to the substrate. Furthermore, the Mirkin methods appear to be limited to the use of gold nanoparticles, whereas, as pointed out above, the method of this invention may use nanoparticles of any type.

The method of this invention, unlike several prior art nanoparticle wire-forming methods, does not require an externally applied electric field and, therefore, works both for metallic and nonmetallic nanoparticles. Metallic nanoparticle wires made using the method of the present invention have good ohmic conductance, and the resistance of such wires decreases markedly after the wires are heated for several hours at a temperature of from 100° C. to 200° C.

The method of this invention also does not require patterns or templates formed on the substrate to form a straight wire. This is in contrast to several of the prior art methods discussed above.

A second aspect of this invention provides a method of making integrated nanoparticle wire arrays using discontinuous EDCD. This method involves:
(A) depositing a first layer of parallel or substantially parallel wires on a hydrophilic substrate by a process comprising:
  (1) at about ambient temperature and at or near atmospheric pressure, immersing a hydrophilic solid substrate at a non-horizontal angle into a suspension of nanoparticles in a solvent, the suspension having a negative meniscus, the immersion of the substrate forming a solid-liquid-air interface at the meniscus;
  (2) gradually exposing the immersed substrate to air by gradually removing the suspension, thereby causing deposition of the nanoparticles at a first location on the substrate at said meniscus, thereby forming a first nanoparticle wire on the substrate;
  (3) after a first deposition time period, rapidly removing a portion of the suspension, thereby causing deposition to stop and then re-start at a second location on the substrate at the meniscus;
  (4) continuing to gradually expose the immersed substrate to air by gradually removing the suspension for a second deposition period, thereby forming a second nanoparticle wire on the substrate; and optionally
  (5) repeating steps (3) and (4) one or more times to form one or more successive nanoparticle wires on the substrate;
(B) depositing a second layer of parallel wires onto the first layer of parallel wires by a process comprising:
  (1) rotating the substrate in a plane of the substrate and re-immersing the substrate into the suspension at a non-horizontal second angle that places the meniscus of the suspension at said second angle relative to the first layer of wires;
  (2) gradually exposing the immersed substrate to air by gradually removing the suspension, thereby causing deposition of the nanoparticles at a first location on the substrate at the meniscus, thereby forming a first second-layer nanoparticle wire on the substrate;
  (3) after a first deposition time period, rapidly removing a portion of the suspension, thereby causing deposition to stop and then re-start at a second location on the substrate at the meniscus;
  (4) continuing to gradually expose the immersed substrate to air by gradually removing the suspension for a second deposition period, thereby forming a second second-layer nanoparticle wire on the substrate; and optionally
  (5) repeating steps (3) and (4) one or more times to form one or more successive second-layer nanoparticle wires on the substrate;
  whereby the second layer of wires forms electrically intersecting arrays with the first layer of wires; and optionally
(C) depositing successive layers of wires by repeating steps (B)(1)-(5).

A third aspect of this invention provides a method of making integrated nanoparticle wire arrays which involves steps (A)-(C) of the above-described method of making integrated nanoparticle wire arrays and further includes the step of depositing a layer of electroactive material between the first and second layers of wires.

BRIEF DESCRIPTION OF THE DRAWINGS

FIGS. 1-4 represent non-limiting illustrations of the present invention.

FIGS. 4A and 4B are scanning electron microscope (SEM, LEO 1460VP) images of nanoparticle wires made by the discontinuous EDCD method of the present invention, wherein FIG. 4A shows images at a first deposition time of 30 minutes and at a second deposition time of 10 minutes, and FIG. 4B shows images after a first volume of 0.1 milliliters of the suspension is removed and after a second volume of 0.2 milliliters of the suspension is removed.

DETAILED DESCRIPTION OF THE INVENTION

As stated above, one aspect of the present invention is directed to a new method of making self-assembled nanoparticle wires, referred to herein as "discontinuous evaporation-driven colloidal deposition" (hereinafter referred to as "discontinuous EDCD").

As used herein, the term "self-assembled" relative to the nanoparticle wires means that the wires are formed spontaneously on their own, in the meniscus region, once the substrate is immersed into the nanoparticle suspension.

Although evaporation is the technique discussed herein for gradually removing solvent in the method of this invention, it is to be understood that other slow solvent-removal techniques can be used, e.g., those using a low-speed pump.

Figure 1A:
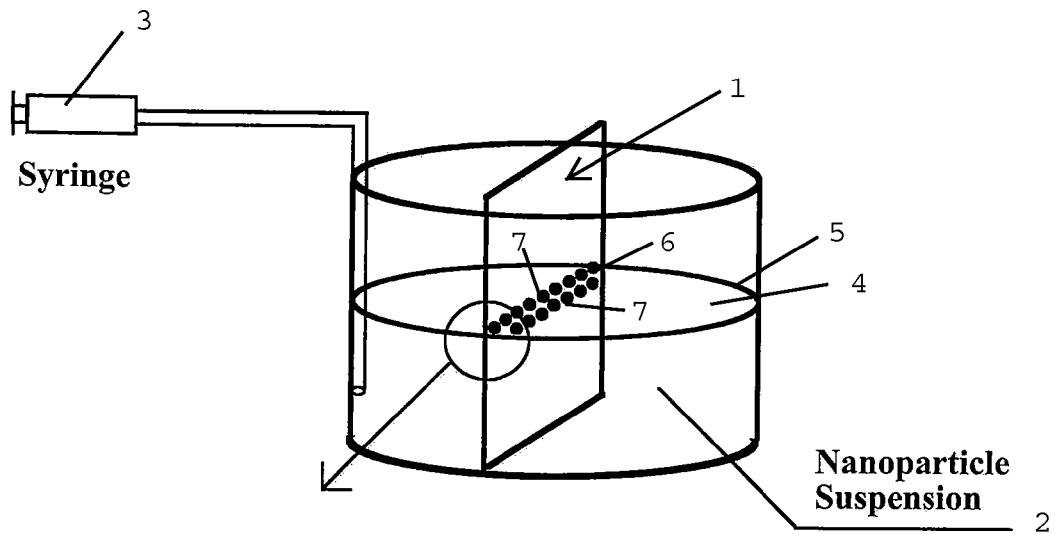
FIG. 1A is a systematic illustration of a hydrophilic substrate immersed in a nanoparticle suspension, with nanoparticle deposition occurring at the meniscus region of the air-water-substrate interface to form nanoparticle wires.

In this method, as illustrated, e.g., in FIG. 1a, at about ambient temperature (e.g., from about 25° C. to about 30° C.) and at or near (about) atmospheric pressure, a hydrophilic substrate 1 is immersed non-horizontally into a suspension 2 of nanoparticles in a solvent, and the immersed substrate is gradually exposed to air by evaporation (or other gradual solvent removal technique). Interfacial forces within the meniscus region 5 at the solid liquid-air interface 4 cause nanoparticles 6 in the suspension to deposit onto and adhere to the substrate to form a nanoparticle wire 7. The deposition process is then interrupted and resumed at a new location on the substrate when a small amount of the suspension solution is suddenly removed, e.g., by a syringe 3. While uninterrupted evaporation (or other solvent removal technique) results in a continuous nanoparticle thin film, evaporation followed by rapid removal of a small quantity of the suspension leads to the formation of a nanoparticle wire. Successive removal of the suspension leads to formation of nanoparticle wires 7 on the substrate.

The container in which the suspension is disposed can be open or closed, with open currently being preferred.

The method of this invention is conducted at about ambient temperature, e.g., from about 25° C. to about 30° C., and at or near atmospheric pressure. At ambient temperature, whether the container is open or closed, the vapor pressure in the gas phase will generally be the natural, equilibrium vapor pressure (usually close to atmospheric pressure). For depositions made at temperatures higher or lower than ambient temperature, the vapor pressure will be determined by the temperature of the solvent and the initial conditions of the experiment, but will in almost all cases be less than or equal to the saturated vapor pressure.

The wires formed by the method of this invention can be of any desired length. For example, the wires can be quite long, e.g., greater than about 1 centimeter.

Figure 1B:
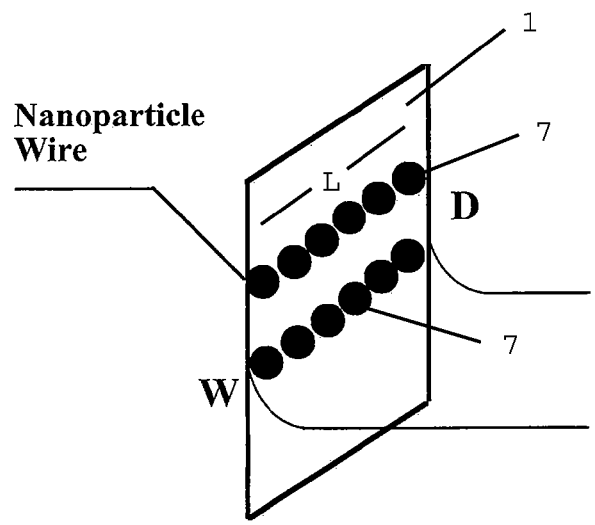
FIG. 1B is a schematic close-up view of the hydrophilic substrate from FIG. 1 with nanoparticle wires formed thereon.
Figure 2A:
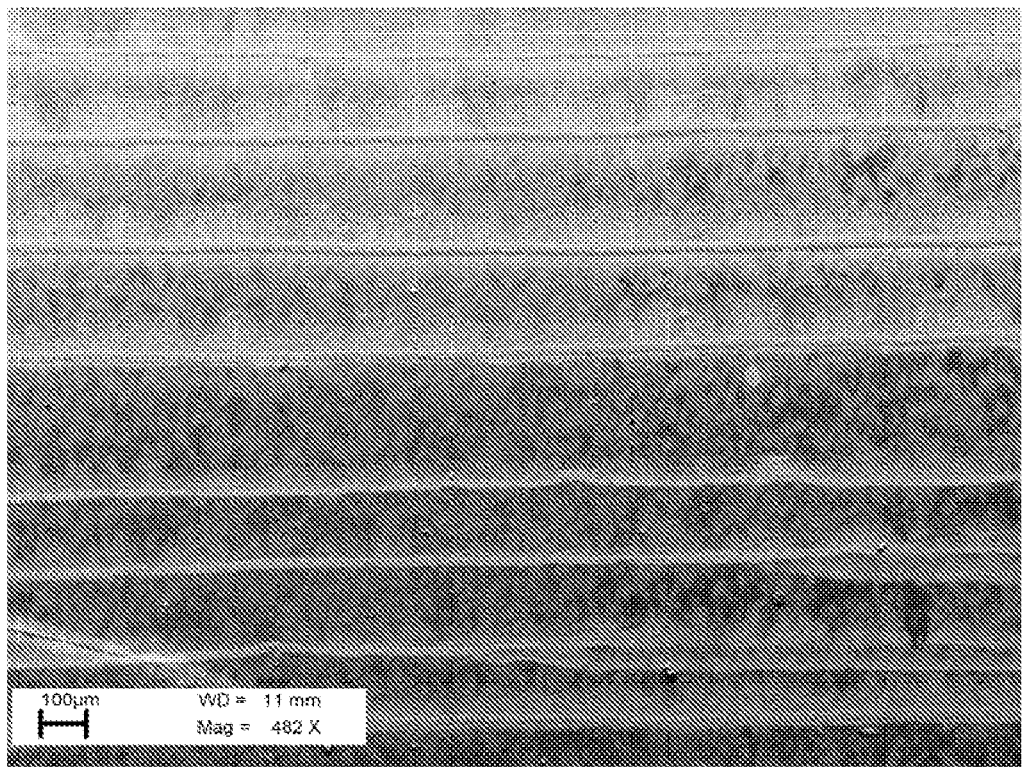
FIGS. 2A and 2B are scanning electron microscope (SEM, LEO 1460VP) images of nanoparticle wires made by the discontinuous EDCD method of the present invention.
Figure 2B:
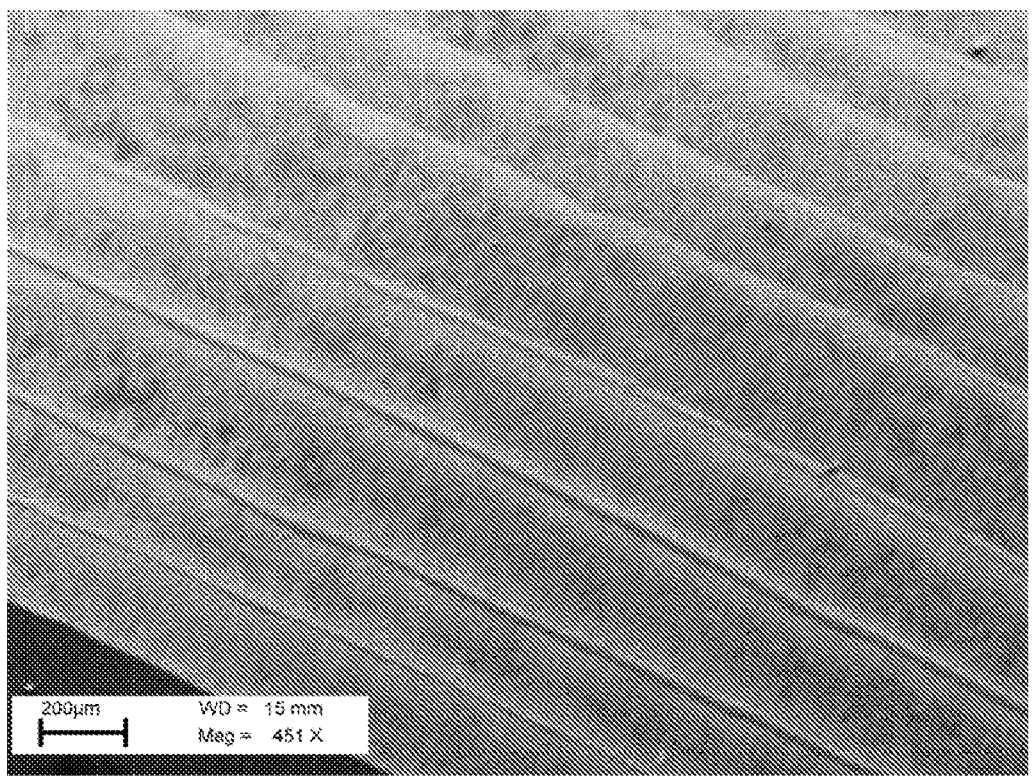
Figure 3A:
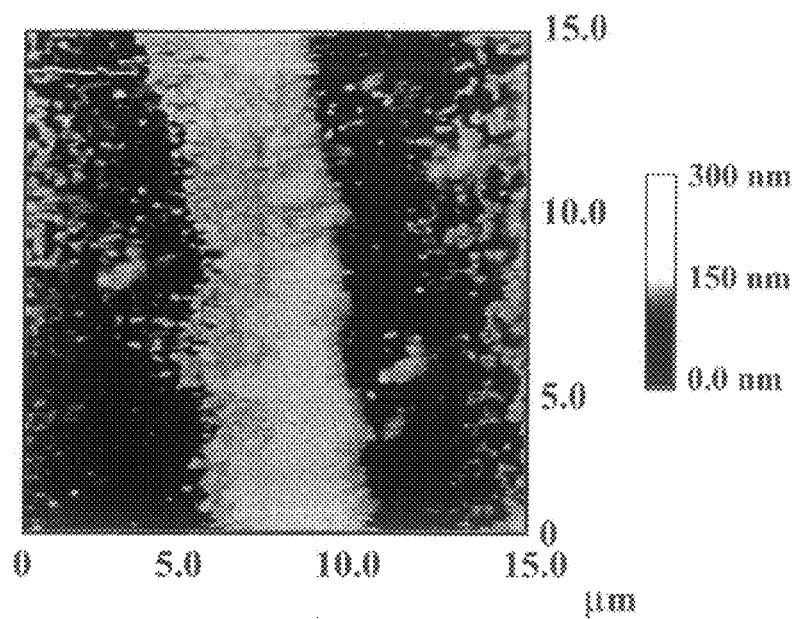
FIGS. 3A and 3B are atomic force microscope (AFM, DI Nanoscope IIIa) images of nanoparticle wires made by the discontinuous EDCD method of the present invention.
Figure 3B:
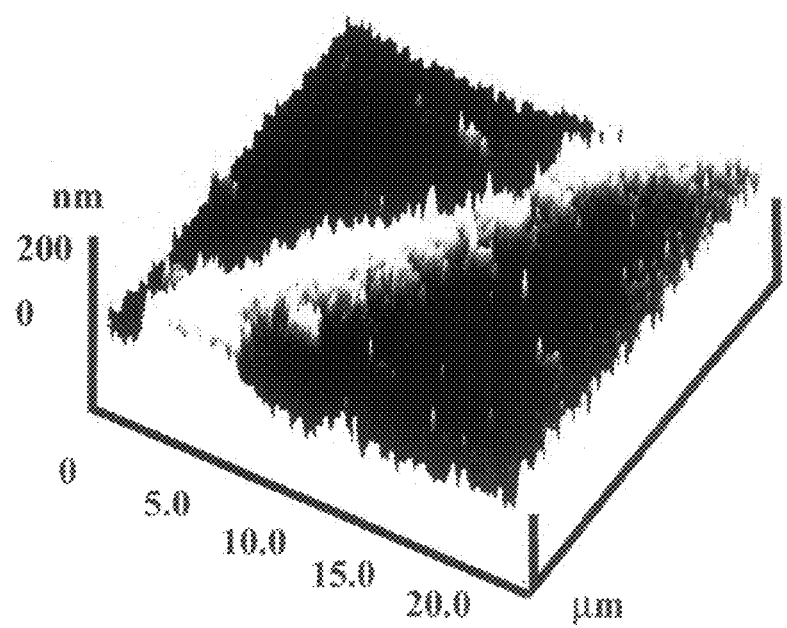

The width W of each wire (see FIG. 1B) is determined by the evaporation rate and the deposition time. The evaporation rate can be 100 nanometers per second and the deposition time can range from several seconds to minutes. The distance D (see FIG. 1B) between two adjacent wires is controlled by the volume of the suspension removed between each deposition episode during the discontinuous EDCD operation. The length L (see FIG. 1B) of the wires depends on substrate size and can be several centimeters. In J. J. Diao, J. B. Hutchison, Guanghong Luo, and M. E. Reeves, "Theoretical analysis of vertical colloidal deposition", *J. Chem. Phys.* 122, (2005), which is hereby incorporated by reference herein, it is shown that the thickness of the material deposited depends upon temperature, contact angle, sticking coefficient, and solvent viscosity.

In the methods of this invention, the substrate is immersed into the suspension of nanoparticles at a non-horizontal angle, i.e., an angle other than 0° or 180°. For example, the substrate can be immersed vertically (i.e., at a 90° angle) into the suspension.

The solvent used in the nanoparticle suspension is preferably distilled water, but other solvents may be used. The only requirements for the solvent used in the present invention is that the solvent be free of sediments or other foreign particles and that the solvent form a negative meniscus with the substrate.

The concentration of nanoparticles in the suspension preferably ranges from about 0.0002% to about 0.006% by weight.

Suitable hydrophilic substrates for use in this invention include, e.g., glass, silicon and mica, with glass being preferred. The substrate should be cleaned prior to use in the method of this invention to avoid interference of the wire-forming method by contaminants (e.g., dust). Conventional cleaning methods for semiconducting and insulating substrates can be used.

Because it does not require the application of an electric field, the discontinuous EDCD method of this invention can be used to form both metallic and nonmetallic nanoparticle wires.

The nanoparticles used in the present invention can be metallic or non-metallic. For example, the nanoparticles can be plastic, insulators, magnetic particles, metallic oxides, or semiconductors.

Non-limiting examples of suitable metallic materials for forming the nanoparticles include, e.g., gold, tin, chromium, iron, nickel, silver, titanium, cobalt, zinc, platinum, palladium, osmium, lead, iridium, molybdenum, vanadium, aluminum, and combinations thereof. Non-limiting examples of suitable metal oxides which can be used to form the nanoparticles include, e.g., tin dioxide, chromia, iron oxide, nickel oxide, silver oxide, titanium oxide, cobalt oxide, zinc oxide, platinum oxide, palladium oxide, vanadium oxide, molybdenum oxide, lead oxide and combinations thereof.

As noted above, non-limiting examples of suitable non-metallic materials for use as the nanoparticles include plastics, e.g., latex.

Suitable nanoparticles for use in the present invention can be obtained commercially. The nanoparticles can also be made by a simple reaction. For example, the growth of gold nanoparticles can be initiated in an aqueous mixture of $HAuCl_4$ and $Na_2S$, the following reaction being the initial reaction process:

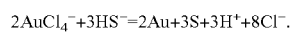

$$2AuCl_4^- + 3HS^- = 2Au + 3S + 3H^+ + 8Cl^-.$$

In the above process, Au is liberated for subsequent nucleation and growth, and gold nanoparticles are formed in the mixed aqueous solution. The size of the gold nanoparticles will depend on the initial concentration and mixed ratio of the solutions of the $HAuCl_4$ and $Na_2S$. Once the gold nanoparticles are synthesized, the substrate is placed into the mixture, where the gold nanoparticles are found in the solution and in the meniscus between the suspension, substrate and air.

Polymeric nanoparticles can be formed by known polymerization or emulsification processes.

The nanoparticles used in the present invention can be of any shape, with spherical being particularly suitable.

The nanoparticles used in the invention preferably have a uniform diameter of from about 2 to about 50 nm.

The deposition rate of the nanoparticles onto the substrate will preferably range from about 10 to about 100 nanometers per second. The deposition rate can be controlled by changing the temperature and solvent viscosity. Reference is made, e.g., to Equations 6, 8 and 9 of the previously-mentioned article J. J. Diao, J. B. Hutchinson, Guanghong Luo, and M. E. Reeves, "Theoretical Analysis of Vertical Colloidal Deposition", J. Chem. Phys. 122 (2005), which was previously incorporated by reference herein.

The deposition time period to form each nanoparticle wire on the substrate will preferably range from about 10 seconds to about 30 minutes.

If a low-speed pump or other solvent-removal technique is used in place of evaporation to gradually expose the immersed substrate to air, the solvent is removed preferably at a rate of from about 10 to about 100 nanometers per second.

In the step of the method of this invention wherein a portion of the solvent is rapidly removed to cause deposition to stop and then re-start, the rate of solvent removal is preferably about 200,000 nanometers per second.

Applicants do not wish to be bound by the following theory but only offer it as a possible explanation of what is occurring during the steps of the method of this invention. The behavior of nanoparticles in a dilute homogeneous suspension can be described by a random-walk diffusion process. As such, these particles should stay non-aggregated in the bulk suspension. However, the nanoparticles in the meniscus region of the suspension (i.e., the liquid-air-substrate interface) are strongly attracted to the substrate when the separation between the particles and the substrate surface is smaller than the mean-free path for colloidal motion. This attraction can be considered to be a wetting force between the nanoparticle and the substrate. During evaporation, the distance between the nanoparticles and the substrate may experience a further reduction due to the loss of water content. This leads to the deposition of nanoparticles on the substrate as long as the substrate is wet by the solvent. While gold nanoparticle films form on glass substrates, no films develop on hydrophobic wax surfaces because the wetting force directs particles away from, rather than towards, the substrate. See J. J. Diao; F. S. Qiu; G. D. Chen and M. E. Reeves (2003) *J. Phys. D Appl. Phys.* 36, L25, and J. J. Diao, J. B. Hutchinson, Guanghong Luo, and M. E. Reeves, J. Chem. Phys. 122 (2005), which were previously incorporated by reference herein.

Because the width of the nanoparticle wires and the distance between adjacent wires are conveniently controlled by the deposition time and the volume of liquid removed after each deposition episode during the discontinuous EDCD operation, the width W of the nanoparticle wire can be estimated using equation (1):

$$W = vt \quad (1)$$

wherein v and t represent the suspension surface descending speed and the time of each deposition step, respectively.

The distance D between two adjacent nanoparticle wires can be determined using equation (2):

$$D = \Delta V/S \quad (2)$$

wherein $\Delta V$ represents the volume of the suspension removed at each step, and S is the area of the cross surface of the suspension container.

For a full-cover nanoparticle wire, the areal density of nanoparticles in the wires, N, can be written as equation (3):

$$N = \alpha \frac{C}{v} \quad (3)$$

wherein C represents the concentration of the suspension, v (as noted above) is the suspension surface descending speed, and α is the deposition constant for a given nanoparticle, substrate, solvent and temperature. Equation (3) shows that the areal density is directly proportional to the concentration of the suspension and inversely dependent upon the suspension surface descending speed of deposition.

A detailed analysis shows α in Equation (3) is proportional to temperature and inversely proportional to the solvent's viscosity, in accordance with Equation (4) below, demonstrating that these properties can be controlled to determine the wire's thickness.

$$\alpha = \frac{\psi \theta k_B T}{6 \pi r \eta}. \quad (4)$$

Equation (4) corresponds to Equation (6) in the aforementioned article authored by J. J. Diao, J. B. Hutchinson, Guanghong Luo, and M. E. Reeves.

By using metallic nanoparticles, a promising aspect of discontinuous EDCD is the possibility of simply and quickly creating electrical connections at ambient conditions in liquid environments. In Example 5 set forth in the Experimental section herein, which used gold nanoparticles, nanowires were generated possessing dramatically higher conductivity (about 10 fold) than gold nanowires created using other methods.

A second aspect of the present invention is directed to a method of making integrated nanoparticle wire arrays using discontinuous EDCD. In this method, a first array of parallel or substantially parallel wires is deposited using the discontinuous EDCD method of making nanoparticle wires described herein. After depositing the first array (or layer) of parallel or substantially parallel wires, the substrate is removed from the suspension, rotated in the plane of the substrate, and re-immersed at a different non-horizontal angle from that at which the substrate was originally immersed into the suspension. Specifically, the substrate is re-immersed in the suspension at a non-horizontal second angle that places the meniscus of the suspension at the second angle relative to the first layer of wires. The second array of parallel or substantially parallel wires is then deposited using the discontinuous EDCD method of this invention.

The second array of parallel or substantially parallel wires will deposit on and form electrically intersecting arrays with the first array of wires. The angle between the two wire arrays is easily controlled by changing the relative rotation of the substrate. Intervening layers with nonmetallic properties, such as photonic semiconductors, can be deposited, also by discontinuous EDCD or by another method, e.g., spin casting. The top and bottom wire arrays or layers can serve as electrodes for arrays of devices.

A third aspect of this invention provides a method of making integrated nanoparticle wire arrays which involves making the first and second layers of nanoparticle wires as described above and further includes the step of depositing a layer of electroactive material between the first and second layers of wires. The layer of electroactive material is preferably deposited onto the first layer of parallel wires by spin coating, organometallic vapor deposition, drop coating, sputtering or pulsed-laser deposition. The electroactive material is preferably selected from metallic oxide, photosensitive materials, magnetic materials, and semiconducting materials.

The discontinuous EDCD method of the present invention has a wide range of additional potential applications. For example, the method can be used to grow conducting and insulating wires, such as from high kappa dielectrics for optical or wireless applications or for the synthesis of optical band gap materials. The discontinuous EDCD method of this invention can be used to directly attach macroscopic electronics to nanoparticles. The method of this invention can be used to create sandwich-type arrays of photovoltaic and other electro-optically active semiconductors. Furthermore, grids of nanoparticle wires made using the method of this invention can be used as the backbone for chemical sensors and biosensors by taking advantage of molecular linkers based on thiol binders.

The nanoparticle wires formed by the discontinuous EDCD method of this invention can also be used in the applications disclosed in the following articles: Duan, X., Huang, Y., Cui, Y., Wang, J., and Lieber, C. M. (2001) Indium Phosphide Nanowires as Building Blocks for Nanoscale Electronic and Optoelectronic Devices, *Nature* 409, 66-69; Patolsky, F., Zheng, G., Hayden, O., Lakadamyali, M., Zhuang, X., and Lieber, C. M. (2004) Electrical Detection of Single Viruses, *Proc. Natl. Acad, Sci., U.S.A.* 101, 14017-14022; Cui, Y., and Lieber, C. M. (2001) Functional Nanoscale Electronic Devices Assembled Using Silicon Nanowire Building Blocks, *Science* 291, 851-853; and Huang, Y., Duan, X., Wei, Q., and Lieber, C. M. (2001) Directed Assembly of One-Dimensional Nanostructures into Functional Networks, *Science* 291, 630-633. The foregoing articles are each incorporated by reference herein.

Experimental

The Examples below used latex and gold nanospheres with a diameter of 140 nm or 210 nm (LADD Research Industries, 40782 or 40784). In each Example, a suspension was made by diluting 0.5 mL latex nanosphere-bearing solution to 10 mL using distilled deionized water. Glass cover slips (Fisher Scientific) were used as substrates in the Examples. All Examples were conducted at room temperature and atmospheric pressure. The substrates were immersed vertically into the suspension. A Scanning Electron Microscope (SEM, LEO 1460VP) and an Atomic Force Microscope (AFM, DI NanoScope IIIa) were used to characterize the nanoparticle wires harvested after the Examples were completed.

EXAMPLES 1-4

Example 1 used latex nanospheres having a diameter of 140 mn, a deposition time $W_1$ of 10 minutes, and a volume of suspension D removed at each step of 0.2 mL.

Example 2 used latex nanospheres having a diameter of 140 nm, a deposition time $W_2$ of 30 minutes, and a volume of suspension D removed at each step of 0.2 mL.

Example 3 used latex nanospheres having a diameter of 210 nm, a deposition time W of 5 minutes, and a volume of suspension $D_1$ removed at each step of 0.1 mL.

Example 4 used latex nanospheres having a diameter of 210 nm, a deposition time W of 10 minutes, and a volume of suspension $D_2$ removed at each step of 0.2 mL.

EXAMPLE 5

Example 5 used gold nanoparticles having a diameter of 12 nm, a deposition time W of 10 minutes, and a volume of suspension $D_1$ removed at each step of 0.1 mL. The resulting nanoparticle wires had a resistance R of 7100 ohms. The wires were then heated for a time H of 2 hours each, at temperatures $T_1$ and $T_2$ of 120° C. and 170° C. After heating, the wires had a resistance R of 425 ohms, which was 10 times higher than the resistance of the wires prepared in the methods disclosed in the Velev article and in the '200 patent, discussed previously herein.

Results and Discussion

Figure 4A:
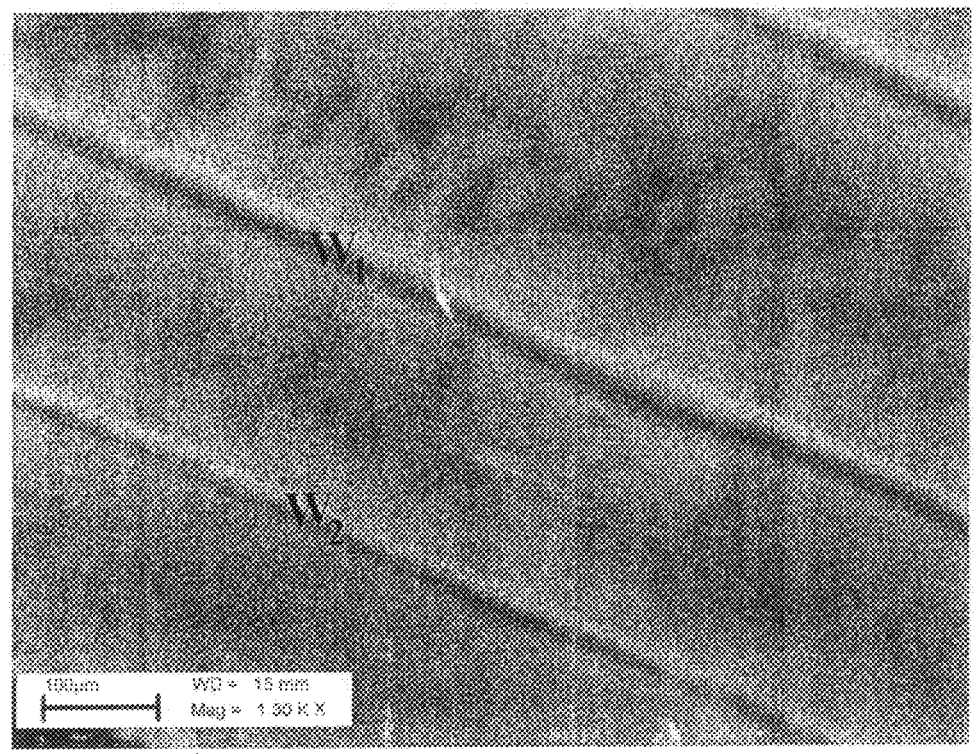
Figure 4B:
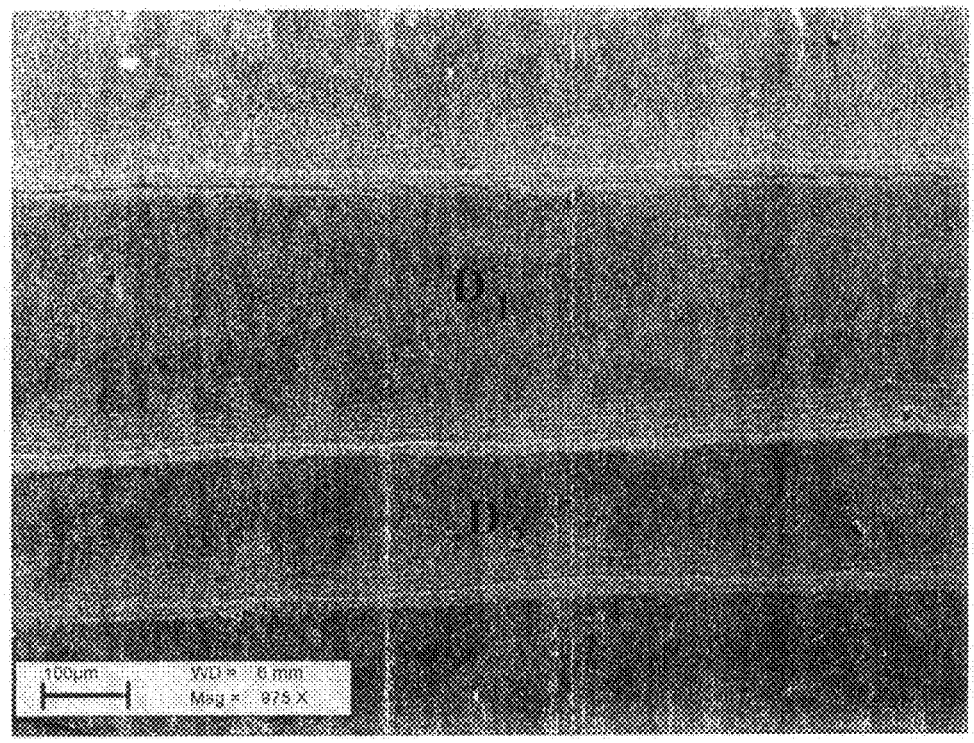

Both SEM and AFM images reveal the presence of nanosphere wires having micron scale width (see FIGS. 2A, 2B, 3A and 3B). Nanoparticle wires formed at different depositional times are shown in FIG. 4(a). It is readily seen that the widths of the wires formed at a short deposition time span ($W_1$=10 minutes) are only one-half of the widths of the wires grown with a double length of deposition time ($W_2$=30 minutes). This indicates that the width of the nanoparticle wires can be controlled by deposition time in a discontinuous EDCD operation. Furthermore, the distance between two adjacent wires depends on the volume of suspension removed at each step. As shown in FIG. 4(b), the distance, $D_2$, formed by removing 0.2 mL of suspension nearly doubles the distance, $D_1$, that is seen when 0.1 mL of suspension is removed.

The discontinuous EDCD method of the present invention is a simple and easy method for producing nanoparticle wires. The method of this invention may have a wide usage for both metallic and nonmetallic nanoparticle deposition. Preliminary results using gold and latex nanosphere suspensions and glass substrates successfully demonstrate the validity of the discontinuous EDCD method, as shown by the micron-wide nanoparticle wire revealed by SEM and AFM images (see FIGS. 2-4).

The foregoing description of the invention is thus illustrative and explanatory, and various changes in the equipment, as well as in the details of the methods and techniques disclosed herein may be made without departing from the spirit of the invention, which is defined by the claims.

What is claimed is:

1. A method for making self-assembled nanoparticle wires, comprising:
   (1) at about ambient temperature and at or near atmospheric pressure, immersing a hydrophilic solid substrate at a non-horizontal angle into a suspension of nanoparticles in a solvent, the suspension having a negative meniscus, the immersion of the substrate forming a solid-liquid-air interface at the meniscus;
   (2) gradually exposing the immersed substrate to air by gradually removing the suspension, thereby causing deposition of the nanoparticles at a first location on the substrate at the meniscus, forming a first nanoparticle wire on the substrate;
   (3) after a first deposition time period, rapidly removing a portion of the suspension, thereby causing deposition to stop and then re-start at a second location on the substrate at the meniscus;
   (4) continuing to gradually expose the immersed substrate to air by gradually removing the suspension for a second deposition period, thereby forming a second nanoparticle wire on the substrate; and optionally (5) repeating steps (3) and (4) one or more times to form one or more successive nanoparticle wires on the substrate.

2. A method according to claim 1, wherein the solvent is deionized water.

3. A method according to claim 1, wherein the substrate is immersed vertically into the suspension.

4. A method according to claim 1, wherein in step (2) and/or step (4), the solution is removed by evaporation.

5. A method according to claim 1, wherein in step (2) and/or in step (4), the solution is removed by using a low-speed pump.

6. A method according to claim 1, wherein in step (2) and/or step (4), the solution is removed at a rate of from about 10 to about 100 nanometers per second.

7. A method according to claim 1, wherein in step (3), the solution is removed at a rate of about 200,000 nanometers per second.

8. A method according to claim 1, wherein the nanoparticles are metallic.

9. A method according to claim 8, wherein the nanoparticles are made of gold.

10. A method according to claim 1, wherein the nanoparticles are plastic.

11. A method according to claim 10, wherein the nanoparticles are made of latex.

12. A method according to claim 1, wherein the nanoparticles are insulators.

13. A method according to claim 1, wherein the nanoparticles are magnetic.

14. A method according to claim 1, wherein the nanoparticles are metallic oxides.

15. A method according to claim 1, wherein the nanoparticles are semiconductors.

16. A method according to claim 1, wherein the suspension comprises a concentration of nanoparticles of from about 0.0002% to 0.006% by weight.

17. A method according to claim 1, wherein the substrate is made of glass, silicon or mica.

18. A method according to claim 1, wherein the nanoparticles are deposited on the substrate at a rate ranging from about 10 to about 100 nanometers per second.

19. A method according to claim 1, wherein the first and second deposition periods each range from about 10 seconds to about 30 minutes.

20. A method of making integrated nanoparticle wire arrays, comprising:
  (A) depositing a first layer of parallel or substantially parallel wires on a hydrophilic substrate by a process comprising:
    (1) at about ambient temperature and at or near atmospheric pressure, immersing a hydrophilic solid substrate at a non-horizontal angle into a suspension of nanoparticles in a solvent, the suspension having a negative meniscus, the immersion of the substrate forming a solid-liquid-air interface at the meniscus;
    (2) gradually exposing the immersed substrate to air by gradually removing the suspension, thereby causing deposition of the nanoparticles at a first location on the substrate at said meniscus, thereby forming a first nanoparticle wire on the substrate;
    (3) after a first deposition time period, rapidly removing a portion of the suspension, thereby causing deposition to stop and then re-start at a second location on the substrate at the meniscus;
    (4) continuing to gradually expose the immersed substrate to air by gradually removing the suspension for a second deposition period, thereby forming a second nanoparticle wire on the substrate; and optionally
    (5) repeating steps (A)(3) and (A)(4) one or more times to form one or more successive nanoparticle wires on the substrate;
  (B) depositing a second layer of parallel or substantially parallel wires onto the first layer of parallel or substantially parallel wires by a process comprising:
    (1) rotating the substrate in a plane of the substrate and re-immersing the substrate into the suspension at a non-horizontal second angle that places the meniscus of the suspension at said second angle relative to the first layer of wires;
    (2) gradually exposing the immersed substrate to air by gradually removing the suspension, thereby causing deposition of the nanoparticles at a first location on the substrate at the meniscus, thereby forming a first second-layer nanoparticle wire on the substrate;
    (3) after a first deposition time period, rapidly removing a portion of the suspension, thereby causing deposition to stop and then re-start at a second location on the substrate at the meniscus;
    (4) continuing to gradually expose the immersed substrate to air by gradually removing the suspension for a second deposition period, thereby forming a second second-layer nanoparticle wire on the substrate; and optionally
    (5) repeating steps (B)(3) and (B)(4) one or more times to form one or more successive second-layer nanoparticle wires on the substrate;
    whereby the second layer of wires forms electrically intersecting arrays with the first layer of wires; and optionally
  (C) depositing successive layers of wires by repeating steps (B)(1)-(5).

21. A method of making integrated layered device arrays, comprising:
  (A) depositing a first layer of parallel wires on a hydrophilic substrate by a process comprising:
    (1) at about ambient temperature and at or near atmospheric pressure, immersing a hydrophilic solid substrate at a non-horizontal angle into a suspension of nanoparticles in a solvent, the suspension having a negative meniscus, the immersion of the substrate forming a solid-liquid-air interface at the meniscus;
    (2) gradually exposing the immersed substrate to air by gradually removing the suspension, thereby causing deposition of the nanoparticles at a first location on the substrate at the meniscus, thereby forming a first nanoparticle wire on the substrate;
    (3) after a first deposition time period, rapidly removing a portion of the suspension, thereby causing deposition to stop and then re-start at a second location on the substrate at the meniscus;
    (4) continuing to gradually expose the immersed substrate to air by gradually removing the suspension for a second deposition period, thereby forming a second nanoparticle wire on the substrate; and optionally
    (5) repeating steps (A)(3) and (A)(4) one or more times to form one or more successive nanoparticle wires on the substrate, the successive nanoparticles wires constituting the first layer of parallel or substantially parallel wires on the substrate, the first layer of parallel or substantially parallel wires constituting an electrode;

(B) depositing a layer of electroactive material onto the first layer of parallel or substantially parallel wires;
(C) depositing a second layer of parallel or substantially parallel wires onto the layer of electroactive material to form a counterelectrode to the electrode formed by the first layer of parallel or substantially parallel wires by a process comprising:
  (1) rotating the substrate in a plane of the substrate and re-immersing the substrate into the suspension at a non-horizontal second angle that places the meniscus of the suspension at said second angle relative to the first layer of wires;
  (2) gradually exposing the immersed substrate to air by gradually removing the suspension, thereby causing deposition of the nanoparticles at a first location on the substrate at the meniscus, thereby forming a first second-layer nanoparticle wire on the substrate;
  (3) after a first deposition time period, rapidly removing a portion of the suspension, thereby causing deposition to stop and then re-start at a second location on the substrate at the meniscus;
  (4) continuing to gradually expose the immersed substrate to air by gradually removing the suspension for a second deposition period, thereby forming a second second-layer nanoparticle wire on the substrate; and optionally
  (5) repeating steps (B)(3) and (B)(4) one or more times to form one or more successive second-layer nanoparticle wires on the substrate;
  whereby the second layer of wires forms electrically intersecting arrays with the first layer of wires; and optionally
(D) depositing successive layers of wires by repeating steps (B)(1)-(5).

22. A method according to claim 21, wherein the layer of electroactive material is deposited onto the first layer of parallel or substantially parallel wires by a process selected from the group consisting of spin coating, organometallic vapor deposition, drop coating, sputtering and pulsed-laser deposition.

23. A method according to claim 21, wherein the electroactive material is selected from the group consisting of metallic oxide, photosensitive materials, magnetic materials, and semiconducting materials.

* * * * *